United States Patent Office.

JAMES BAKER, OF IJAMSVILLE, MARYLAND.

Letters Patent No. 94,465, dated September 7, 1869.

IMPROVED COMPOSITION FOR WHITEWASHING.

The Schedule referred to in these Letters Patent and making part of the same.

*To all whom it may concern:*

Be it known that I, JAMES BAKER, of Ijamsville, in the county of Frederick, and State of Maryland, have invented certain new and useful Improvements in Whitewasher; and I do hereby declare that the following is a full, clear, and exact description thereof.

My invention consists in the combination of the ingredients hereinafter mentioned, for the production of a whitewash which shall possess great tenacity and also preservative qualities.

To enable others to make it, I will now describe my method of making the same.

I take three pounds of lime, with one gill of common salt, and pour a sufficient quantity of hot water over the lime and salt to bring them to the consistency of common whitewash.

I then boil the contents until the lime is thoroughly slaked. Care should be taken to continually stir while undergoing this process.

After removing from the fire, I add one gill of linseed-oil, one ounce of glue, one ounce of white lead, and one ounce of starch, all of which should be well incorporated in the wash, which can be given any color you may desire, by simply adding the appropriate ingredient.

Having thus described my invention,

What I claim, and desire to secure by Letters Patent, is—

The combination of the within-named ingredients, for the purpose specified.

In testimony that I claim the foregoing as my own, I affix my signature, in presence of two witnesses.

JAMES BAKER.

Witnesses:
   T. H. ALEXANDER,
   C. ALEXANDER.